(12) United States Patent
Borell et al.

(10) Patent No.: US 9,586,287 B2
(45) Date of Patent: Mar. 7, 2017

(54) METHOD OF LASER WELDING A NUCLEAR FUEL ROD

(75) Inventors: Sten Borell, Västerås (SE); Tomas Rostvall, Stockholm (SE)

(73) Assignee: Westinghouse Electric Sweden AB, Västerås (SE)

( * ) Notice: Subject to any disclaimer, the term of this patent is extended or adjusted under 35 U.S.C. 154(b) by 609 days.

(21) Appl. No.: 14/110,941

(22) PCT Filed: Mar. 22, 2012

(86) PCT No.: PCT/EP2012/055076
§ 371 (c)(1),
(2), (4) Date: Apr. 2, 2014

(87) PCT Pub. No.: WO2012/146444
PCT Pub. Date: Nov. 1, 2012

(65) Prior Publication Data
US 2014/0251960 A1    Sep. 11, 2014

(30) Foreign Application Priority Data

Apr. 28, 2011 (SE) ...................................... 1150373

(51) Int. Cl.
*B23K 26/20* (2014.01)
*B23K 26/03* (2006.01)
(Continued)

(52) U.S. Cl.
CPC .............. *B23K 26/20* (2013.01); *B23K 26/03* (2013.01); *B23K 26/032* (2013.01);
(Continued)

(58) Field of Classification Search
CPC ...... B23K 26/20; B23K 26/03; B23K 26/032; B23K 26/123; B23K 26/28
See application file for complete search history.

(56) References Cited

U.S. PATENT DOCUMENTS 5,231,261 A * 7/1993 Duthoo ................ B23K 26/032
219/121.63
5,651,903 A   7/1997 Shirk
(Continued)

FOREIGN PATENT DOCUMENTS

DE       10160623 A1    6/2003
FR        2625022 A1    6/1989
(Continued)

OTHER PUBLICATIONS

Notice of Reasons for Rejection for Japanese Patent No. 2014-509807, dated Oct. 6, 2015.
(Continued)

*Primary Examiner* — Brian Jennison
(74) *Attorney, Agent, or Firm* — MKG, LLC

(57) ABSTRACT

A method of welding a fuel rod includes the following steps. An end plug and a cladding tube of the fuel rod are brought together to abut each other, and welded by applying a laser beam directed to a welding zone to melt material of the end plug and the cladding tube. The welding is sensed by sensing radiation within a first wavelength range, which includes the wavelength of the laser beam coming from reflections from the welding zone, sensing radiation within a second wavelength range different from the first wavelength range, which includes infrared radiation from melted material, and sensing radiation within a third wavelength range different from the first and second wavelength ranges, which includes radiation from plasma. The welding and melting of material is monitored by monitoring the sensed radiations.

19 Claims, 3 Drawing Sheets

Figure 1:
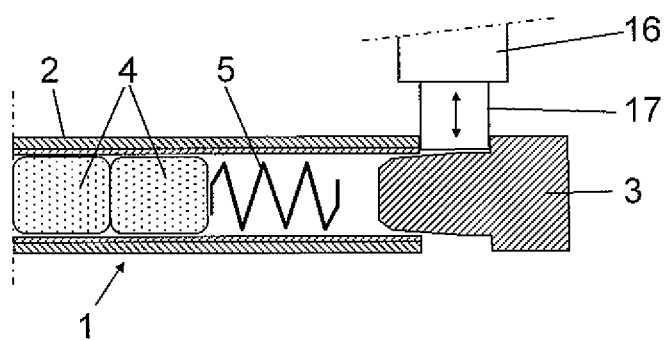

(51) Int. Cl.
    B23K 26/12    (2014.01)
    B23K 26/28    (2014.01)
    G21C 3/10     (2006.01)
(52) U.S. Cl.
    CPC ............ *B23K 26/123* (2013.01); *B23K 26/28* (2013.01); *G21C 3/10* (2013.01); *Y02E 30/40* (2013.01)

(56) References Cited

U.S. PATENT DOCUMENTS

| | | | |
|---|---|---|---|
| 5,958,267 | A | 9/1999 | Lingenfelter et al. |
| 6,670,574 | B1 | 12/2003 | Bates et al. |
| 6,710,283 | B2 | 3/2004 | Mori et al. |
| 6,791,057 | B1 | 9/2004 | Kratzch et al. |
| 2008/0245778 | A1* | 10/2008 | D'Angelo .......... B23K 26/0665 219/121.64 |

FOREIGN PATENT DOCUMENTS

| | | |
|---|---|---|
| JP | H0699295 A | 4/1994 |
| JP | 2992015 B1 | 12/1999 |

OTHER PUBLICATIONS

Norman et al., Theoretical analysis of photodiode monitoring of laser welding defects by imaging combined with modelling, Lulea University of Technology, Journal of Physics D: Applied Physics 41 (2008).

Shao, J. et al., Review of Techniques for On-line Monitoring and Inspection of Laser Welding, Journal of Physics: Conference Series 15 (2005) pp. 101-107.

Norman, P. et al., Theoretical Analysis of Photodiode Monitoring of Laser Welding Defects by Imaging Combined with Modelling, Journal of Physics: D Applied Physics 41 (Sep. 2008), pp. 1-9.

Zhang, P. et al., Real-time Monitoring of Laser Welding Based on Multiple Sensors, 2008 Chinese Control and Decision Conference (CCDC 2008), pp. 1746-1748.

International Preliminary Report on Patentability with Written Opinion for PCT/EP2012/055076, dated Nov. 7, 2013.

* cited by examiner

METHOD OF LASER WELDING A NUCLEAR FUEL ROD

FIELD OF THE INVENTION

The present invention refers generally to welding of nuclear components, in particular nuclear components made of zirconium based alloys.

BACKGROUND OF THE INVENTION AND PRIOR ART

Particular difficulties arise when welding the end plugs to the cladding tube of a fuel rod. The difficulties include the material of which the end plugs and the fuel rods are made, namely zirconium based alloys, such as Zircaloy-1, Zircaloy-2, Zircaloy-4, ZIRLO, ZIRLO-B, etc. Zirconium based alloys have a high disposition for oxidation at the melting temperature.

A further difficulty is that no atmospheric air or other surrounding gases are allowed to enter the interior of the fuel rod in connection with the final filling of hyperbaric helium, sealing and welding of the fuel rod. There are two methods of solving this problem. The fuel rod may be filled with fuel pellets and the rod be closed with end plugs. The end plugs are welded to the cladding tube in their final position without hyperbaric helium. Thereafter, fuel rod is filled with helium gas through a so called fill hole through one of the end plugs. The fill hole is then closed by means of a final welding operation. Alternatively, the fuel rod is filled with fuel pellets and helium gas prior to the final positioning and welding of the end plugs. The pressure prevailing in the fuel rods filled with helium is typically 5-10 bars for boiling water reactors, BWR, and 30-70 bars for pressurized water reactors, PWR. The ability to weld the end plug under these pressures in helium constitutes a further difficulty but eliminates the need for a filling hole and a welding step to close such a filling hole.

FR-A-2 625 022 discloses a method of welding an end plug to a cladding tube of a nuclear fuel rod. The known method comprises the steps of attaching a lower end plug, filling the interior of the fuel rod with fuel pellets and helium gas, positioning the upper end plug to abut the upper end of the cladding tube: at an interface, and applying a laser beam of a laser source. The proposed laser is a pulsed laser. The laser beam is directed to a welding zone at the interface to melt material of the end plug and the cladding tube at the interface.

U.S. Pat. No. 5,231,261 discloses a pulsed laser welding equipment for welding of fuel rods and monitoring the laser beam. The monitoring of the laser beam is done before the beam passes through the protective lens. It can therefore not identify changes to the protective lens e.g. from soot emanating from the welding process. The welding equipment setup for the girth welding is not done under pressure. The welding under helium pressure is done in a separate setup for a filling hole, thus not eliminating the need for such a filling hole and welding process step.

U.S. Pat. No. 5,958,267 discloses a method for welding fuel rods under high pressure and to control the laser position with a video system. The method claims to prevent soot accumulating on a laser window and to limit plasma formation. In practice this is difficult to achieve and the process, without control of the plasma, is possibly unstable.

U.S. Pat. No. 6,670,574 discloses a laser weld monitoring system for monitoring the welding of a pulsed laser beam. The system comprises two sensors, one sensor for sensing infrared radiation and one sensor for sensing reflection of the light of the laser beam. The method proposes essentially a trial and error method with a plurality of welds to correlate the complicated sensor curves to welding properties.

U.S. Pat. No. 5,651,903 also discloses a system for monitoring laser welding by means of an equipment comprising two sensors arranged beside the optical path of the laser beam. A first sensor senses infrared radiation of the temperature of the weld and a second sensor senses ultraviolet radiation of the plasma of the weld. The electrical signals are used to monitoring variations compared to a predetermined anomaly values obtained by empirical testing.

U.S. Pat. No. 6,710,283 discloses further laser weld monitoring system. The system comprises two sensors arranged beside the optical path of the laser beam. A first sensor senses reflected light of the laser beam and a second sensor, called a plasmatic sensor, senses the light emitted from welding zone. The method uses the frequency spectrum to compare actual variations in the signal with predetermined threshold values.

SUMMARY OF THE INVENTION

An object of the present invention is to provide an improved method of welding a fuel rod, especially of welding end plugs without fill hole to a cladding tube of the fuel rod.

This object is achieved by the method of welding a nuclear fuel rod including two end plugs, a cladding tube and a pile of fuel pellets in the interior of the cladding tube, the method comprising the steps of:

bringing one of the end plugs and the cladding tube together to abut each other at an interface, and welding the end plug and the cladding tube by means of a welding equipment by applying a laser beam of a laser source of the welding equipment, the laser beam having a wavelength and being directed along an optical path of the welding equipment to a welding zone at the interface to melt material of the end plug and the cladding tube at the interface, characterised by the further steps of:

sensing the welding by sensing radiation from the welding zone comprising:

sensing radiation within a first wavelength range, which includes the wavelength of the laser beam coming from reflections from the welding zone, sensing radiation within a second wavelength range different from the first wavelength range, which includes infrared radiation from melted material in the welding zone, and sensing radiation within a third wavelength range different from the first wavelength range and the second wavelength range, which includes radiation from plasma in the welding zone, and monitoring the welding and melting of material by monitoring the sensed radiations.

By sensing different wavelengths of the radiation from the welding zone it is possible to monitor the quality of the weld and the joint of the end plug and the fuel rod. The three different wavelength ranges are independent of each other and provides different information. A possible deviation from a normal value of the radiation within any one of the three wavelength ranges may be used as an indication of an improper welding process enabling the operator to adjust the welding equipment. For instance, the operator may adjust the power of the laser source within an allowed range.

The monitoring provides direct feedback during the welding process, and thus a warning if anything goes wrong or if there is a trend to be act upon.

The first wavelength range, which may be sensed by a first sensor, includes the wavelength of the laser beam coming from reflections from the welding zone. The intensity of this sensed radiation is an indication of soot or other changes of the transmission of the protective lenses through which the laser beams passes. It also indicates changes of incoming laser power and changes of reflection on the work piece.

The second wavelength range, which may be sensed by a second sensor, includes infrared radiation from melted material in the welding zone. The intensity of this radiation is thus an indication of the temperature and size of the melted material. This indicates also the effectiveness of the welding, i.e. the penetration of the weld.

The third wavelength range, which may be sensed by a third sensor, includes radiation from plasma in the welding zone. The intensity of this radiation is an indication of the amount and the extension of the plasma formed during the welding. An increased signal from the plasma also indicate decreasing effectiveness of the welding, i.e. the penetration of the weld.

Compared to earlier methods of monitoring, this method has a comparatively simple and straight forward interpretation and does not need a lot of trial and error weldings to find a welding characteristic to compare the curves with. In principal only one good weld is needed as a base to compare actual welding curves.

Laser welding for joining end plugs to fuel rods has a plurality of advantages compare to other welding methods, such as electron beam welding and TIG-welding. The investment costs are low, for instance since it is possible to enclose an end section of the fuel rod to be welded. A relatively small enclosure may thus be used, and thus a relatively small floor space will be occupied by the welding equipment. It is possible to use one single laser source for sequential welding of a plurality of fuel rods in several welding equipments. Laser welding enables achievement of a smooth weld surface which is important when introducing the fuel rods in spacers of the fuel assembly. The alloy depletion is low ensuring proper corrosion resistance. There is no risk of tungsten contamination from a TIG seal welding of a fill hole.

The sensing and monitoring may take place during the whole time period of the welding of the joint between the end plug and the cladding tube. The fuel rod is rotated during the welding so that the laser beam is moved relatively the fuel rod along the interface. The welding may be performed during one, two or more revolutions of the fuel rod. Typically, the velocity of the rotation may be about 1 revolution per second, which means that the welding of the end plug to the cladding tube may last for about 2 seconds.

According to an embodiment of the invention, said reflections also includes reflections, or partial reflections, of the laser beam in the optical path, including protective lenses through which the optical beam passes.

According to a further embodiment of the invention, the radiation of at least one of the first wavelength range, the second wavelength range and the third wavelength range is sensed along a direction being coaxial with the optical path at least in the proximity of the welding zone. The radiation to the different sensors may thus be diverted from the optical path to the interface.

According to a further embodiment of the invention, the method also comprises viewing of the welding zone before, and/or during, the welding and melting of material by means of a video camera. It is thus possible for the operator to inspect the interface before the welding is initiated. Advantageously, the method may also comprise controlling the laser beam position relative the interface by means of the viewed interface. Furthermore, the viewing of the welding zone may take place along a viewing direction being coaxial with the optical path at least in the proximity of the welding zone.

According to a further embodiment of the invention, the method also comprises the step of controlling the power of the laser beam in response to the sensed radiations.

According to a further embodiment of the invention, the setup of the laser equipment is optimized and/or controlled using any anomalies of the signal curves from the three different wavelengths. Uneven signal curves compared to a reference signal curve from earlier approved welding test indicate uneven interface or wobble or dirt in the welding area and may lead to pores or uneven welding quality.

According to a further embodiment of the invention, the monitoring step comprises monitoring the intensity of the radiation of the first wavelength range as a first signal level over time to form a first signal curve, monitoring the intensity of the radiation of the second wavelength range, as a second signal level over time to form a second signal curve and monitoring the intensity of the radiation of the third wavelength range as a third signal level over time to form a third signal curve. The setup of the welding equipment may be optimized and/or controlled using the signals levels from the three different wavelengths.

According to a further embodiment of the invention, the method comprises the step of optimizing and verifying the setup of the welding equipment including the power level of the laser beam and the alignment of optical path, including lenses and/or protective lenses, with the signal level of the first wavelength range that includes the radiation of the reflection of the laser beam. During welding the same signal level may be used to control any changes of the transmitted laser beam, e.g. due to soot on the protective lens just above the welding zone.

According to a further embodiment of the invention, the method comprises the step of controlling the focus position, effectiveness and/or penetration of the laser beam by the signal level of the second wavelength range that includes the infrared radiation from the melted material. An increased infrared signal may correspond to a deeper penetration of the weld.

According to a further embodiment of the invention, the method comprises the step of controlling the effectiveness and the penetration of the welding by the signal level of the third wavelength range that includes the radiation from the plasma. An increased plasma signal may correspond to less penetration of the weld.

According to a further embodiment of the invention, the method comprises the step of monitoring any anomalies of any of the signal curves from the three different wavelength ranges compared to a reference signal curve, for instance formed by earlier approved welding tests, to indicate uneven interface or wobble or dirt in the welding zone and/or possible occurrence of pores or uneven welding quality.

According to a further embodiment of the invention, the laser beam is a continuous laser beam. The continuous laser can be generated by e.g. a Yb:YAG-fibre pumped by InGaAs diodes. Typically 500 W laser power is used. The present method is further simplified when used with a continuous laser beam which gives simple stable signals compared to embodiments with a pulsed laser.

According to a further embodiment of the invention, the wavelength of the laser beam lies in the range 1050-1090 nm, preferably in the range 1060-1080 nm, for instance 1070 nm.

According to a further embodiment of the invention, the second wavelength range is 1100-1800 nm.

According to a further embodiment of the invention, the third wavelength is less than 600 nm, preferably 50-600 nm, more preferably 100-600 nm. The signal of the plasma is improved compared to other embodiments that uses only ultraviolet light below 390 nm. Thus, a preferred range of the third wavelength could be 390-600 nm, or 400-600 nm.

According to a further embodiment of the invention, the welding takes place in a closed enclosure containing an atmosphere of helium at a pressure above the atmospheric pressure. A gas flow of typically 50 liter per minutes may be advantageous for limiting the plasma and soot formation and thus protecting the lens above the welding zone. The gas flow preferably enter the equipment below the protective lenses and flow coaxial with the laser beam passing the welding zone. By performing the welding in such a closed enclosure, the welding may be performed in only two steps, one step for the bottom plug and one for the top plug, without the need of a fill hole to be welded after the welding along the interface. Elimination of the fill hole will cut costs and risks in different ways. There will be lower costs for top end plugs with no fill holes. No separate fill hole weld station is needed. No fill hole weld inspection equipment is needed. There is obviously no yield loss for seal welding. The risk of tungsten contamination is eliminated.

The welding may also be performed with other protective gases e.g. argon. When welding the final end plug this can only be done after a secured and sealed attachment of the end plug to the cladding tube as the interior of the fuel rod must contain helium. Welding with argon is cheaper but the welding is less stable and the needed welding power is higher due to a larger formation of plasma in the argon atmosphere.

According to a further embodiment of the invention, the closed enclosure encloses the end plug and an end section of the cladding tube, wherein the method may comprise the preceding steps of: evacuating the interior of the cladding tube and the closed enclosure to a certain vacuum level during a predetermined time period, and then filling the closed enclosure and the interior of the cladding tube with helium to a predetermined pressure.

Furthermore the method may comprise the steps of: prepositioning the end plug on the cladding tube at a determined distance from the cladding tube before the evacuating step, thereby permitting a free flow of gas from and to the interior of the cladding tube, and final positioning of the end plug on the cladding tube after the filling step and before the welding step. Advantageously, the prepositioning of the end plug at the determined distance is made by means of a mechanical stop, which may be displaceable to be introduced into the distance between the cladding tube and the end plug, and withdrawn therefrom.

BRIEF DESCRIPTIONS OF THE DRAWINGS

The invention is now to be explained more closely through a description of various embodiments and with reference to the drawings attached hereto.

FIG. 1 discloses a longitudinal section through an end section of a fuel rod, wherein the end plug is positioned at a distance from the cladding tube.

Figure 2:
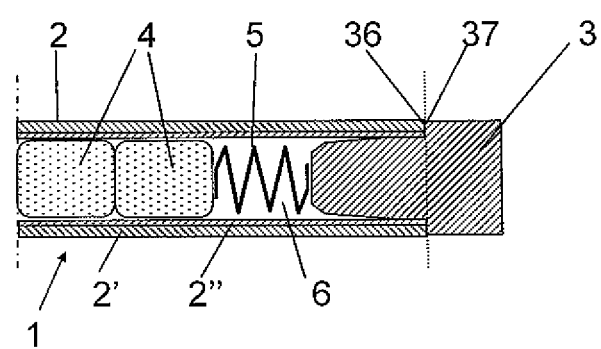

FIG. 2 discloses a longitudinal section through the end section of the fuel rod, wherein the end plug is abutting the cladding tube.

Figure 3:
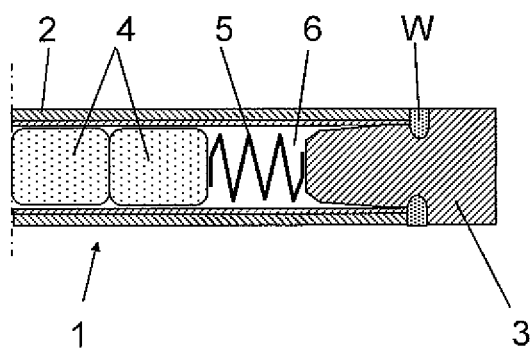

FIG. 3 discloses a longitudinal section through the end section of the fuel rod, wherein the end plug and the cladding tube are welded.

Figure 4:
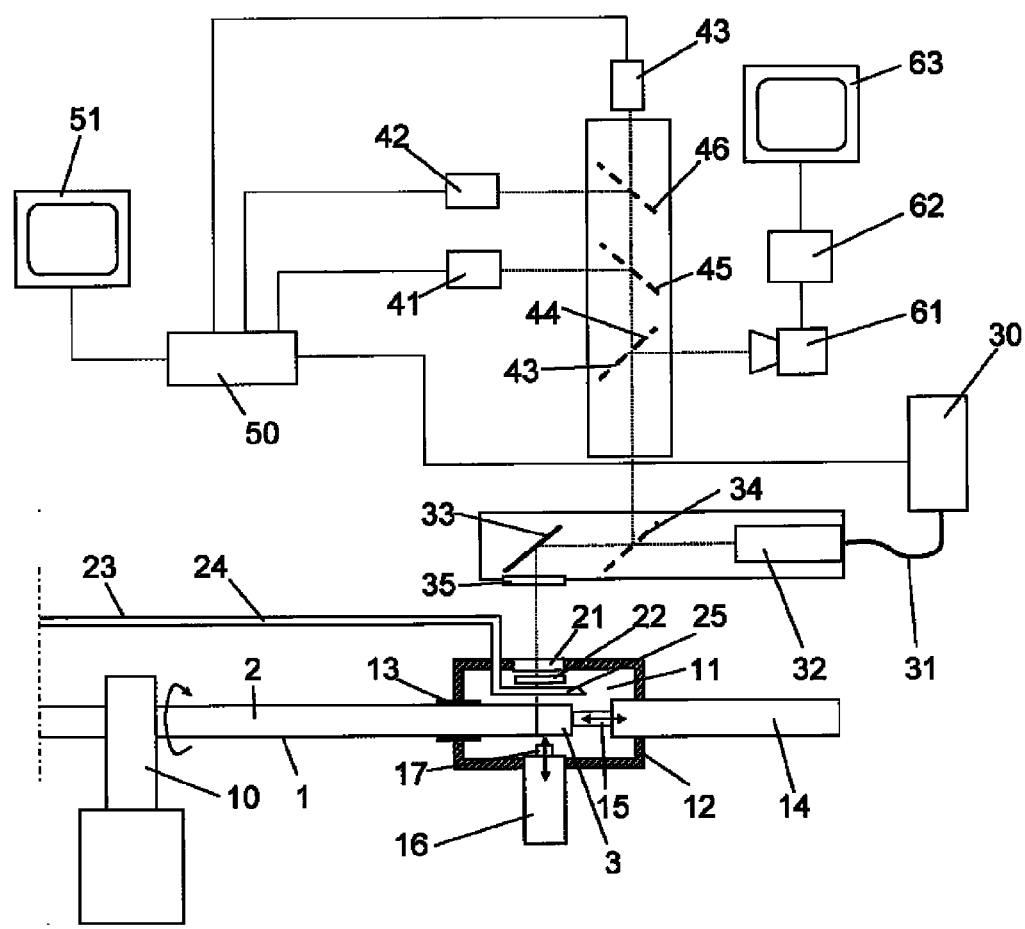

FIG. 4 discloses a schematic view of a welding equipment.

Figure 5:
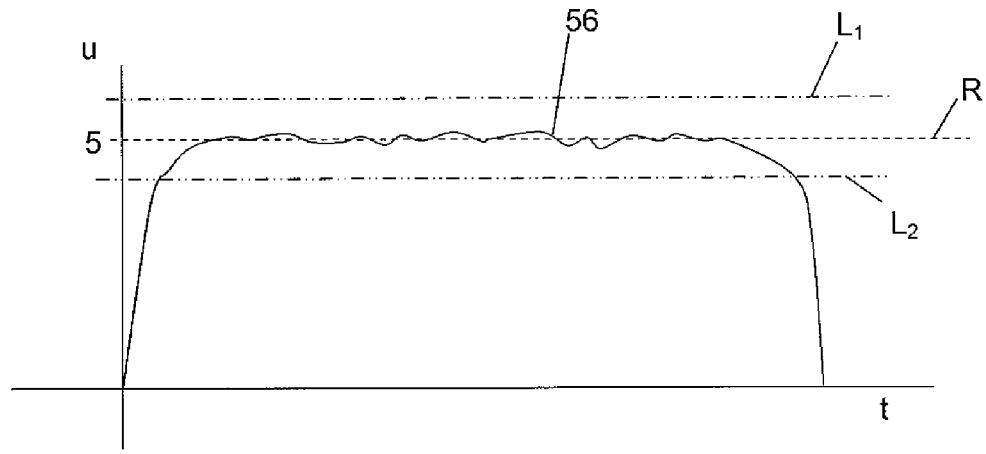

FIG. 5 discloses a diagram of the intensity of the radiation of the first wavelength range.

Figure 6:
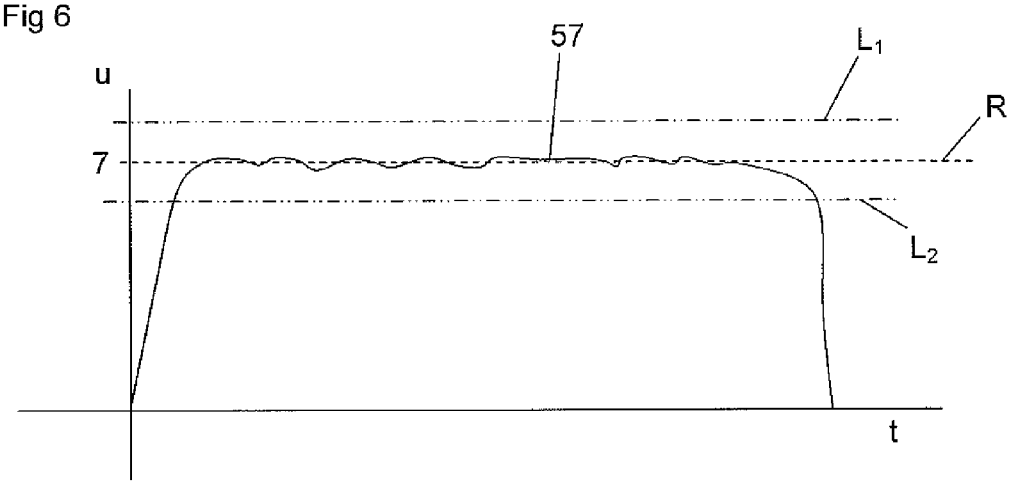

FIG. 6 discloses a diagram of the intensity of the radiation of the second wavelength range.

Figure 7:
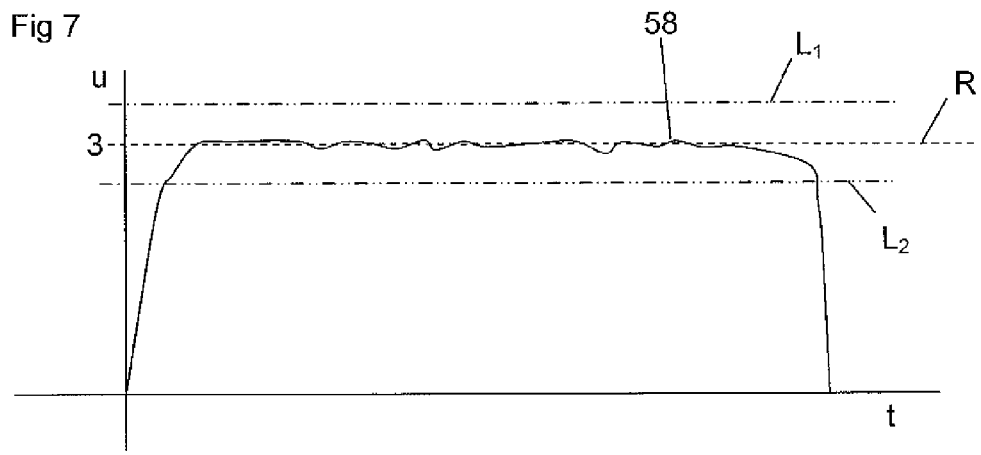

FIG. 7 discloses a diagram of the intensity of the radiation of the third wavelength range.

DETAILED DESCRIPTION

FIGS. 1-3 disclose a fuel rod 1 including a cladding tube 2 and two end plugs 3, one of which is disclosed. The fuel rod 1 includes an upper end plug 3 at the upper end of the cladding tube 2, and a lower end plug at the lower end of the cladding tube 2. The fuel rod 1 also includes a pile of fuel pellets 4 in the interior of the cladding tube 2. The fuel pellets 4 rest directly on the lower end plug. A so called plenum spring 5 is provided between the upper end of the pile of fuel pellets 4 and the upper end plug 3 to maintain the fuel pellets in a proper position in the cladding tube 2 and to ensure a plenum 6 for containing helium and fission gases generated during the fissile process in the nuclear reactor. The nuclear reactor may be a boiling water reactor, BWR, or a pressurized water reactor, PWR. The initial pressure prevailing in the fuel rod 1 filled with helium is typically 5-10 bars for a BWR, and 30-70 bars for a PWR.

In the embodiments disclosed, the cladding tube comprises an outer tube 2' and an inner tube 2" a so called liner.

FIG. 4 discloses a welding equipment for welding the end plug 3 to the cladding tube 2. The welding equipment includes a chuck 10 for holding and rotating the fuel rod and a closed enclosure 11 into which an end section of the fuel rod 1 is introduced via a passage, i.e. an end section of the cladding tube 2 and one of the end plugs 3. The chuck 10 is configured to rotate the fuel rod at a rotary speed of for instance 1 revolution per second.

The closed enclosure 11 includes or is formed by a pressure resistant wall 12. A sealing 13 extends through the wall 12 to seal the passage for the fuel rod 1.

A first positioning device 14 is provided to extend through the wall 12 at an end opposite to the sealing 13. The first positioning device 14 includes a movable piston 15 acting on the end plug 3 of the fuel rod 1 along the longitudinal direction of the fuel rod 1.

Furthermore, a second positioning device 16 is provided to extend through the wall 12. The second positioning device 16 includes a mechanical stop 17 provided in the enclosure 11 to be displaceable along a transversal direction y, being transversal to the longitudinal direction x of the fuel rod 1 between a passive position shown in FIG. 4 and an active position shown in FIG. 1. The mechanical stop 17 when in the active position maintains the and plug 3 at a determined distance from the cladding tube 2 so that gases may be evacuated from the interior of the fuel rod and helium may be filled into the fuel rod 1. When the mechanical stop 17 is withdrawn to the passive position the end plug 3 may be brought to the final position and tight abutment to the cladding tube 2 by means of the first positioning device 14.

Furthermore, the enclosure 11 includes a first protective lens 21 forming a part of the wall 12 of the enclosure 11. A second protective lens 22 is provided within the enclosure inside the first protective lens 21. The first protective lens 21 is relatively thick and configured to withstand the pressure prevailing in the enclosure 11. The second protective lens 22 is thinner than the first protective lens 21 and configured to protect the first protective lens against soot formed during the welding.

A gas supply device 23 is provided for supplying a flow of gas, in the embodiments described helium, to the enclosure 11. The gas supply device 23 comprises a supply conduit 24 and an annular nozzle provided in the enclosure 11. The annular nozzle 25 is provided between the second protective lens 22 and the fuel rod 1, and extends around the second protective lens 22. The flow of helium gas to the enclosure may be for instance about 50 liter per minute. The gas supply device 23 is configured to provide a gas pressure in the enclosure equal to the gas that is to be achieved in the fuel rod when both the end plugs are secured and welded to the cladding tube 2.

The welding equipment also includes a laser source 30 configured to generate a continuous laser beam. The laser source 30 may, for instance, comprise a Yb:YAG fibre laser with a wavelength in the range 1050-1090 nm, preferably in the range 1060-1080 nm, for instance 1070 nm. The YB:YAG-fibre may be pumped by InGaAs diodes.

The laser source 30 transmits the laser beam via a fibre 31 to a primary optic 32. The primary optic 32 transmits the laser beam to a primary mirror 33 via a secondary semitransparent mirror 34. From the primary mirror 33 the laser beam is reflected and directed to the fuel rod 1 and a welding zone 36 at an interface 37 between the end plug 3 and the cladding tube 2.

The laser beam thus extends along an optical path from the laser source 30 to the welding zone 36. The laser beam, reflected by the primary mirror 33, passes through at least one optical focusing lens 35, the first protective lens 21 and the second protective lens 22 along the optical path.

The welding equipment also includes a sensing device including a first sensor 41, a second sensor 42 and a third sensor 43. During welding radiation from the weld zone 36 is transmitted to the sensors 41, 42 and 43 along the optical path through the second protective lens 22, the first protective lens 21 and the optical lens 35. The radiation is the reflected by the primary mirror 33 and the secondary mirror 34 away from the optical path of the laser beam. The radiation from the welding zone 36 is thus extending along a direction that is coaxial with the optical path in the proximity of the welding zone 36 at least along a straight line from the welding zone 36 or to the secondary mirror 34. The sensing device may be operated at a sampling frequency of up to 20 kHz.

Via a first semitransparent mirror 44 the radiation is reflected to the first sensor 41. Via second semitransparent mirror 45 the radiation is reflected to the second sensor 42. The radiation passes through the semitransparent mirrors 44, 45 and 46 to the third sensor 43.

The first sensor 41 is configured to sense radiation from the welding zone 36 within a first wavelength range, which includes the wavelength of the laser beam coming from reflections from the welding zone 36, i.e. wavelengths in the range 1050-1090 nm, preferably in the range 1060-1080 nm, for instance 1070 nm. The reflections from the welding zone 36, that are reflected via a second semitransparent mirror 45, also includes reflections, or partial reflections, of the laser beam in the optical path, including the first and second protective lenses 21, 22 and the at least one optical lens 35.

The second sensor 42 is configured to sense radiation from the welding zone 36 within a second wavelength range different from the first wavelength range. The radiations are reflected to the second sensor via a third semitransparent mirror 46. The second wavelength range includes infrared radiation from melted material in the welding zone 36. The second wavelength range is 1100-1800 nm.

The third sensor 43 is configured to sense radiation from the welding zone 36 within a third wavelength range different from the first wavelength range and the second wavelength range. The radiations to the third sensor passes through the semitransparent mirrors 44, 45 and 46. The third wavelength range includes radiation from plasma in the welding zone 36. The third wavelength is less than 600 nm, preferably 50-600 nm, more preferably 100-600 nm.

The welding equipment also includes a monitoring device configured to monitor the welding and melting of material by monitoring the sensed radiations. The monitoring device comprises a processor 50 and a display 51 communicating with the processor 50. The sensors 41-43 communicate with the processor 50 which receives signals of the radiation of the three wavelength ranges from the sensors 41-43. The monitoring device is thus configured to monitor to an operator on the display the intensities of the wavelength ranges, i.e. the intensity of the radiation of the first wavelength range as a first signal level (in volt) over time (in seconds) to form a first signal curve 56, as illustrated in FIG. 5, the intensity of the radiation of the second wavelength range, as a second signal level (in volt) over time (in seconds) to form a second signal curve 57, as illustrated in FIG. 6 and the intensity of the radiation of the third wavelength range as a third signal level (in volt) over time (in seconds) to form a third signal curve 58, as illustrated in FIG. 7. The signal curves 56-58 can be saved by the processor for future use as reference or quality assurance.

The signal curves 56-57 may be inspected or monitored to lie within an upper limit line L1 and a lower limit line L2. The upper and lower limit lines L1, L2 may represent a deviation of 15%, or preferably of 10%, from a desired signal level.

The signal curves 56-57 may also, or alternatively, be inspected or monitored in relation to a reference line R representing a desired signal level. The line R can alternatively be a saved reference curve from one good weld. The line R can alternatively be a saved reference curve from a mean value curve from several good welds.

Moreover, the welding equipment includes a viewing device configured to enable viewing of the welding zone before, and/or during, the welding and melting of material. To that end the viewing device comprises a video camera 61, a processor 62 and a display 63. If the viewing device is to be used before welding, the enclosure 11 may be illuminated by e.g. LED light. The viewing of the welding zone 36 may take place along a viewing direction being coaxial with the optical path in the proximity of the welding zone 36 at least along a straight line from the welding zone 36 or up to the secondary mirror 34. Thanks to the viewing device, the laser beam position relative the interface 37 may be controlled manually by the operator when inspecting the interface 37 on the display 63 or automatically.

The welding equipment may also include means for controlling the power of the laser beam in response to the sensed radiations by means of the processor 50 controlling the output of the laser source 30. The controlling may be performed manually by the operator when inspecting the signal curves shown on the display 51 or automatically.

The controlling may, preferably as an initial measure, comprise the step of verifying the setup of the welding equipment including the power level of the laser beam and the optical path with the signal level of the first wavelength range that includes the radiation of the reflection of the laser beam.

During welding, or between the welding of the fuel rods 1, the controlling may include the steps of:

controlling the focus position of the laser beam by the signal level of the second wavelength range that includes the infrared radiation from the melted material, and/or controlling the effectiveness and the penetration of the welding by the signal level of the wavelength that includes the radiation from the plasma.

During welding it is also possible to monitor any anomalies any of the signal curves from the three different wavelength ranges compared to a reference signal curve to indicate uneven interface or wobble or dirt in the welding zone and/or possible occurrence of pores or uneven welding quality.

The method and the welding equipment enable achievement of a smooth and uniform weld. The shape of the finished weld W is illustrated in FIG. 3. As can be seen, the surface of the surrounding weld W is even with the surface of the cladding tube 2 and the end plug 3.

Welding of a fuel rod 1 may include the following steps:
prepositioning a bottom end plug to a bottom end section of a cladding tube 2,
introducing the bottom end section into the enclosure 11 and holding the fuel rod 1 by means of the chuck 10,
activating the first positioning device 14 to press the bottom end plug against the cladding tube 2,
evacuating the enclosure 11 to a certain vacuum level during a predetermined time period,
rotating the fuel rod 1 by means of the chuck 10,
inspecting the position of and positioning the interface 37 with the aid of the viewing device,
initiating the welding by the laser source 30,
monitoring the signal curves 56-58 illustrating the intensity of the three wavelength ranges,
removing the fuel rod 1 from the enclosure 11,
prepositioning a top end plug 3 to a top end section of a cladding tube 2,
introducing the top end section into the enclosure 11 and holding the fuel rod 1 by means of the chuck 10,
activating the second positioning device 16 to bring the mechanical stop 17 into contact with the top end section to ensure the determined distance between the top end plug 3 and the cladding tube 2,
evacuating the enclosure 11 a certain vacuum level during a predetermined time period,
filling the enclosure 11 and the interior of the fuel rod 1 with helium to a desired predetermined pressure,
removing the mechanical stop 17,
activating the first positioning device 14 to press the top end plug 3 against the cladding tube 2,
rotating the fuel rod 1 by means of the chuck 10,
inspecting the position of and positioning the interface 37 with the aid of the viewing device,
initiating the welding by the laser source 30,
monitoring the signal curves 56-58 illustrating the intensity of the three wavelength ranges, and
removing the fuel rod 1 from the enclosure 11.

The present invention is not limited to the embodiments and descriptions given above but may be varied and modified within the scope of the following claims.

What is claimed is:

1. Method of welding a nuclear fuel rod including two end plugs, a cladding tube and a pile of fuel pellets in the interior of the cladding tube, the method comprising the steps of:
bringing one of the end plugs and the cladding tube together to abut each other at an interface; and
welding the end plug and the cladding tube by means of a welding equipment by applying a laser beam of a laser source of the welding equipment, the laser beam having a wavelength and being directed along an optical path of the welding equipment to a welding zone at the interface to melt material of the end plug and the cladding tube at the interface;
wherein the welding takes place in a closed enclosure containing an atmosphere of helium at a pressure above the atmospheric pressure, wherein the closed enclosure encloses the end plug and end section of the cladding tube, and
wherein the method comprises the steps of:
evacuating the interior of the cladding tube and the closed enclosure to a certain vacuum level during a predetermined time period,
then filling the closed enclosure and the interior of the cladding tube with helium to a predetermined pressure,
pre-positioning the end plug on the cladding tube at a determined distance from the cladding tube before the evacuating step, thereby permitting a free flow of gas from and to the interior of the cladding tube, and
final positioning of the end plug on the cladding tube after the filling step and before the welding step, and
wherein the method comprises the further steps of:
sensing the welding by sensing radiation from the welding zone comprising:
sensing radiation within a first wavelength range, which includes the wavelength of the laser beam coming from reflections from the welding zone;
sensing radiation within a second wavelength range different from the first wavelength range, which includes infrared radiation from melted material in the welding zone;
sensing radiation within a third wavelength range different from the first wavelength range and the second wavelength range, which includes radiation from plasma in the welding zone; and
monitoring the welding and melting of material by monitoring the sensed radiations.

2. The method according to claim 1, wherein said reflections also includes reflections of the laser beam in the optical path, including protective lenses through which the optical beam passes.

3. The method according to claim 1, wherein the radiation of at least one of the first wavelength range, the second wavelength range and the third wavelength range is sensed along a direction being coaxial with the optical path at least in the proximity of the welding zone.

4. The method according to claim 1, further comprising viewing of the welding zone before and during the welding and melting of material by means of a video camera.

5. The method according to claim 4, further comprising controlling the laser beam position relative the interface by means of the viewed interface.

6. The method according to claim 4, wherein the viewing of the welding zone takes place along a viewing direction being coaxial with the optical path at least in the proximity of the welding zone.

7. The method according to claim 1, further comprising the step of controlling the power of the laser beam in response to the sensed radiations.

8. The method according to claim 1, wherein the monitoring step comprises:
   monitoring the intensity of the radiation of the first wavelength range as a first signal level over time to form a first signal curve;
   monitoring the intensity of the radiation of the second wavelength range, as a second signal level over time to form a second signal curve; and
   monitoring the intensity of the radiation of the third wavelength range as a third signal level over time to form a third signal curve.

9. The method according to claim 8, further comprising the step of verifying the setup of the welding equipment including the power level of the laser beam and the optical path with the signal level of the first wavelength range that includes the radiation of the reflection of the laser beam.

10. The method according to claim 8, further comprising the step of controlling the focus position of the laser beam by the signal level of the second wavelength range that includes the infrared radiation from the melted material.

11. The method according to claim 8 further comprising the step of controlling the effectiveness and the penetration of the welding by the signal level of the third wavelength range that includes the radiation from the plasma.

12. The method according to claim 8, wherein the method comprises the step of monitoring any anomalies any of the signal curves from the three different wavelength ranges compared to a reference signal curve to indicate uneven interface or wobble or dirt in the welding zone and/or possible occurrence of pores or uneven welding quality.

13. The method according to claim 1, wherein the laser beam is a continuous laser beam.

14. The method according to claim 1, wherein the wavelength of the laser beam lies in a range of 1050-1090 nm.

15. The method according to claim 14, wherein the wavelength of the laser lies in a range of 1060-1080 nm.

16. The method according to claim 15, wherein the wavelength is 1070 nm.

17. The method according to claim 1, wherein the second wavelength range is 1100-1800 nm.

18. The method according to claim 1, wherein the third wavelength is less than 600 nm.

19. The method according to claim 18, wherein the third wavelength range is 390-600 nm.

* * * * *